Figure 1:
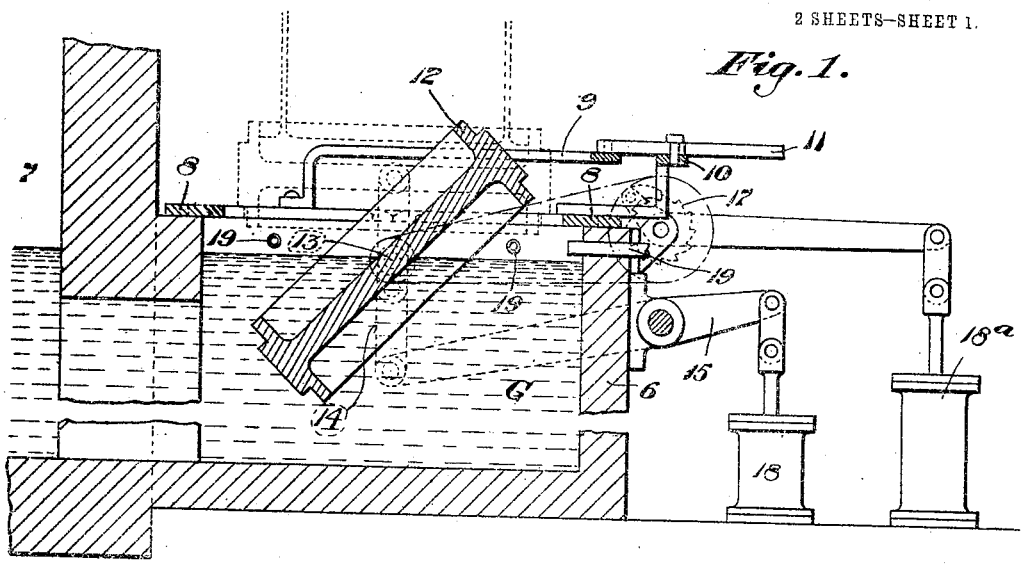

W. L. MONRO.
METHOD AND APPARATUS FOR DRAWING GLASS.
APPLICATION FILED DEC. 28, 1907.

1,125,588.

Patented Jan. 19, 1915.

2 SHEETS—SHEET 1.

Witness:
Chas. S. Lipley
Fred Staub

Inventor:
William L. Monro
By F. W. H. Clay
atty

W. L. MONRO.
METHOD AND APPARATUS FOR DRAWING GLASS.
APPLICATION FILED DEC. 28, 1907.
1,125,588.
Patented Jan. 19, 1915.
2 SHEETS—SHEET 2.
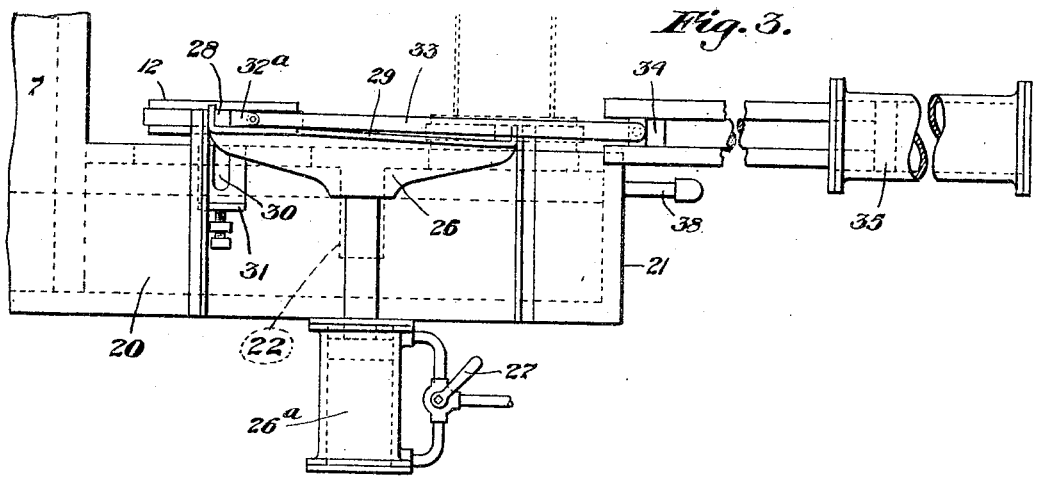
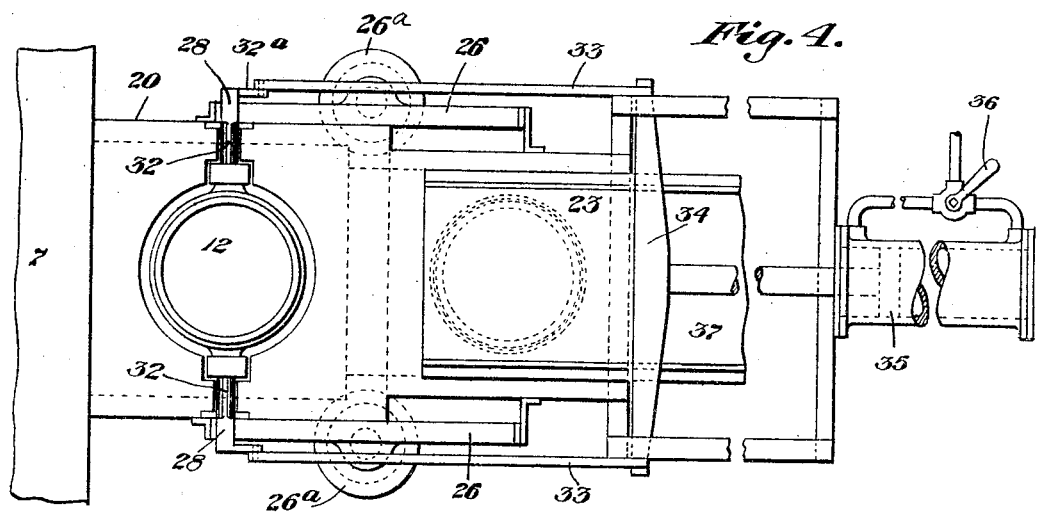
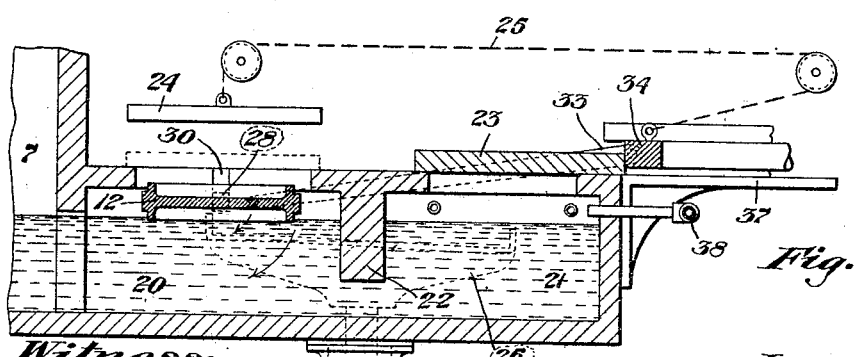
Witness:
Chas. S. Sipley
Fred Staub
Inventor;
William L. Monro
By F. W. H. Clay att.

UNITED STATES PATENT OFFICE.

WILLIAM L. MONRO, OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY.

METHOD AND APPARATUS FOR DRAWING GLASS.

1,125,588. Specification of Letters Patent. Patented Jan. 19, 1915.

Application filed December 28, 1907. Serial No. 408,398.

*To all whom it may concern:*

Be it known that I, WILLIAM L. MONRO, a citizen of the United States, residing at Pittsburgh, in the State of Pennsylvania, have invented a certain new and useful Method and Apparatus for Drawing Glass, of which the following is a specification.

My invention relates to the art of drawing and blowing glass, particularly as practised by machine methods, and its primary object is to avoid the usual double transfer of glass, as by pouring or ladling into a drawing pot before drawing.

Other objects are, to provide for conveniently clearing the drawing vessel; to efficiently handle the drawing pot; to use the drawing pot itself as a ladle; and to generally improve the method of drawing glass direct from a furnace or forehearth.

I have illustrated the process in the accompanying drawings wherein—

Figure 2:
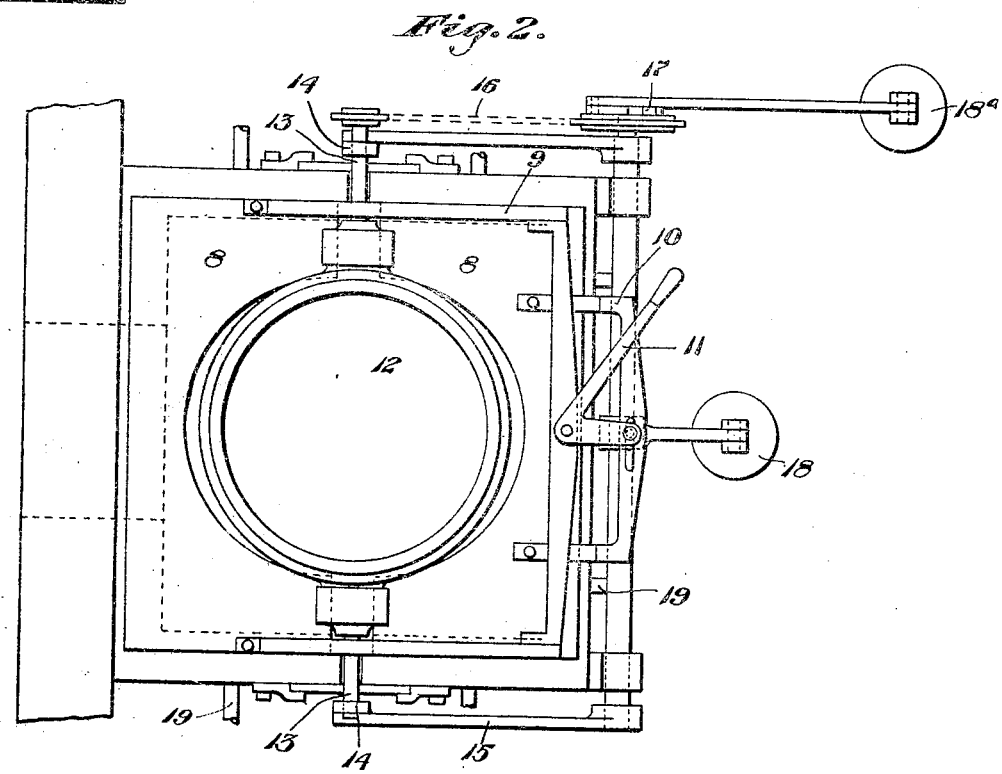

Figure 1 is a vertical section through a simple form of furnace and pot with the pot in dipping position, and Fig. 2 is a plan view of the same with the pot raised but the top-stone thrown open. Figs. 3 and 4 show respectively a side elevation and a top plan of a modified arrangement for drawing at a different position from the dipping position. Fig. 5 is a vertical section through the furnace and pot of Figs. 3 and 4 with the pot lowered in position for dipping and the reducing chamber closed.

The best practice heretofore has been to melt the glass in a furnace and dip it out with ladles which in turn are emptied into a drawing pot from which the cylinders are drawn, after which the pot is cleaned by melting out the residue of glass into a separate receptacle and the waste glass used as cullet. In drawing another glass article another pot must be used while the first part is being cleaned. By my invention the glass is not transferred by a ladle but is taken direct from the furnace or a forehearth and the same vessel that acts as a ladle is also used as a drawing pot. This pot having two cavities on opposite sides, for alternate use, the pot is used continuously, the remaining glass being melted out each time whi'e the reverse side of the pot is being us 1 for drawing.

In Figs. 1 and 2, I show a forehearth 6 extending from a melting furnace 7. It has on top a sectional top-stone 8, 8, the parts of which are supplied with brackets 9, 10, which may be operated by means of a bell crank lever 11 to open and close the top-stone.

Suspended above the opening into the forehearth I place a vessel 12 which is supported on trunnions 13, carried in turn by links 14 and levers 15 which may be operated by the cylinder 18 to raise and lower the vessel 12. This vessel is formed with cavities on both sides and is adapted to be revolved on its axis when lowered into the glass G, so as to dip up a sufficient quantity of glass to draw a cylinder or other article. When the pot 12 is lowered into the glass it is revolved by means of a sprocket chain 16 which may be operated conveniently by ratchet wheel 17 operated by an air cylinder 18$^a$, as will be apparent.

In Fig. 1, I show in dotted lines the elevated position of the pot with the glass therein, and it will be understood that the pot is merely lowered into the glass and revolved to dip a quantity into one of the cavities and then raised to the position shown, when the top-stone 8 is closed, while the drawing apparatus pulls up the cylinder out of the pot, as is usual and well known in this art. While the drawing operation is proceeding, it will be noted that the forehearth is completely closed and thereupon flame is introduced through the blow pipes 19 to melt out and reduce the remnants of glass in the opposite cavity of the pot. By the time the drawing is completed this lower cavity is cleared and it is merely necessary to dip the pot again and reverse its position when the apparatus is ready for another draw. In order to make more certain and uniform the melting back of the remnants of glass, I may use the apparatus shown in Figs. 3 to 5, or an equivalent thereof. In this the forehearth or "dog-house" 20 has a forward extension 21 which is a little larger than the pot and forms a reducing chamber, being separated by a wall 22 from the forehearth 20. This reducing chamber may if desired be covered by a top-stone 23 which is handled as below described, or by hand.

The forehearth 20 has an opening somewhat larger than the drawing pot 12 and is provided with a cover 24 which may be manipulated by the chain 25 attached to a moving part of the machine, so as to be lowered on the forehearth when the pot is carried away.

On the sides of the "dog-house" I provide a couple of carrier brackets 26 which may be conveniently raised and lowered by air cylinders 26ª operated by valves 27.

The pot 12 has near the outer end of its trunnions square blocks 28 which normally rest on the track 29 of the brackets 25.

In the side walls of the forehearth are provided vertical slots 30, covered by slotted plates 31 adjustably mounted, and in position to engage the trunnions 32 of the pot when the latter is lowered by lowering the supporting brackets 26.

The outer ends of the trunnions are provided with cranks 32ª to which are connected the links 33 attached to a cross-head 34 of a piston rod operated by the cylinder 35 and its valve 36. This piston is for the double purpose of sliding the pot on the track 29 and revolving it for dipping. It will be noted that upon lowering the bracket 26 as shown in Fig. 5, the pot will be brought close to the glass in the tank and will rest on its trunnions in the bottom of the slots 30 so that the blocks 28 will be out of engagement with the bracket. In this position the line of thrust on the links 33 will be off the dead center of the crank 32 and by pushing forward the cross-head 34 by means of its piston, the trunnion of the pot will have a bearing in the slot 30 and the pot will be revolved through a half turn. Upon raising the bracket 26 again the blocks 28 will level and steady the pot, which is then raised to the position shown in Fig. 3, whereupon the crank 32 is in the direct line of draw of the piston rod and link. The piston is then drawn back and the pot is slid along the track 29 until it takes the position shown in dotted lines in Fig. 3 over the opening in the reducing chamber 21. Meanwhile the pot has pushed backward the top-stone 23 on to its supporting table 37 and uncovered this opening. The drawing operation now takes place over the reducing chamber, the opening of which is closed by the pot. The bottom cavity of the pot is meanwhile drained and cleared in the chamber 21 by means of blow-pipes 38. It is to be noted that the glass melted down in this chamber will not return to the forehearth under the partition 22 until reduced. When the drawing is finished the cylinder 35 pushes forward the cross-head 34, which returns the pot to its position in Fig. 2, by the links 33, and meanwhile also may if desired push up the top-stone 23 to cover the opening in the reducing chamber.

The cover 24 for the forehearth may conveniently be operated by the movement of the cross-head 34 as indicated in Fig. 5.

From the above description it will be seen that the same vessel is used as a ladle and a drawing pot and therefore all transfers of glass are avoided, as well as the detrimental effects of laps and the tailings resulting from pouring. Since the pot is cleared on one side, while being used on the other, the operation is practically continuous, and the condition of the glass can be maintained uniform.

Of course it will be understood that the apparatus above set forth is illustrative only and my invention in its broad aspects is not confined to any specific design of machinery, nor to the use of power to actuate the mechanism.

Having thus described my invention and illustrated its use, what I claim as new and desire to secure by Letters Patent, is the following:

1. In the manufacture of drawn glass articles, the method which consists in lowering a pot into a body of molten glass with a pot cavity therein facing downwardly, then turning the pot on its horizontal axis to fill said cavity with sufficient glass for the drawing of a single article and revert the pot, then raising the pot to the top of the furnace chamber containing the body of molten glass and drawing an article directly therefrom while the pot is still over said chamber, substantially as described.

2. In the manufacture of drawn glass articles, the method which consists in lowering a double-cavity drawing vessel into a mass of molten glass with one of its cavities facing downward, filling said cavity by a rotary movement of the pot within the mass of molten glass, reverting and raising the pot, and then drawing an article directly from the glass in the filled cavity and simultaneously therewith applying heat to the other pot cavity to melt therefrom the residue of glass left from a previous drawing operation; substantially as described.

3. In the manufacture of drawn glass articles, the method which consists in successively filling opposite cavities of a double-cavity pot by lowering the pot in alternately reversed positions into a mass of molten glass and turning it therein, drawing an article intermediate each two successive filling operations directly from the filled cavity of the pot, and during each drawing operation melting out the residue of glass in the opposite cavity; substantially as described.

4. Apparatus for the manufacture of drawn glass articles, comprising a glass melting furnace having a top opening, a drawing pot mounted for vertical and also for turning movement, operating means for raising and lowering the pot, and operating means for turning the pot to fill it with a charge of glass while in its lowered position; substantially as described.

5. In the manufacture of drawn glass articles, the method which consists in lowering the pot into a body of molten glass with the pot cavity thereof facing downwardly, then turning the pot on its horizontal axis to fill said cavity with sufficient glass for the drawing of an article, then inverting the pot and raising it to the top of the furnace chamber containing the body of molten glass, moving the pot to another position over said chamber, and then drawing an article directly therefrom and during the drawing operation applying heat to the pot to melt out the residue of glass remaining from a previous operation in a second cavity thereof; substantially as described.

6. In glass drawing apparatus, a double pot, and means for dipping said pot into molten glass in either of two reversed positions; substantially as described.

7. The combination with a furnace forehearth having a top opening, of a pivoted drawing pot, means for raising and lowering the pot, and means for turning the pot on its pivots while in its lowered position; substantially as described.

8. The combination with a furnace forehearth having a top opening, of a drawing pot having cavities in opposite sides thereof, means for raising and lowering the pot, and means for turning the pot while in its lowered position; substantially as described.

9. The combination with a furnace having a forehearth, of a pivotally mounted double pot, means for dipping the pot in either one of two reversed positions and for turning it while dipped; substantially as described.

10. The combination with a furnace chamber having a top opening, of a drawing pot movable through said opening, a movable support in which the pot is mounted, means for turning the pot on its support, and means whereby the support may be moved longitudinally to carry the pot toward and away from the opening and also vertically to raise and lower the pot through the opening; substantially as described.

11. The combination with a furnace having a forehearth, said forehearth having a forward extension, and both the forehearth and its extension having a top opening, of a drawing pot, means for moving the pot from a position over one opening to a position over the other opening, means for raising and lowering the pot through the opening in the forehearth, and means for turning the pot to dip it when lowered through said opening; substantially as described.

12. The combination with a furnace having a forehearth, said forehearth having a forward extension, and both the forehearth and its extension having a top opening, of a drawing pot, means for moving the pot from a position over one opening to a position over the other opening, means for raising and lowering the pot through the opening in the forehearth, and means for turning the pot to dip it when lowered through said opening, together with means for applying heat to the reverse side of the pot while it is over the opening in the said extension; substantially as described.

13. The combination with a furnace chamber having a top opening, of a drawing pot movable through said opening, a movable support in which the pot is mounted, means for turning the pot on its support, and means whereby the support may be moved to carry the pot toward and away from the opening and also vertically to raise and lower the pot through the opening; substantially as described.

In testimony whereof I have hereunder signed my name in the presence of the two subscribed witnesses.

WM. L. MONRO.

Witnesses:
  Geo. N. Monro, Jr.,
  F. W. H. Clay.